March 22, 1955 U. E. DAVIS 2,704,412
FISHING ROD HOLDER
Filed Jan. 14, 1952 2 Sheets-Sheet 1
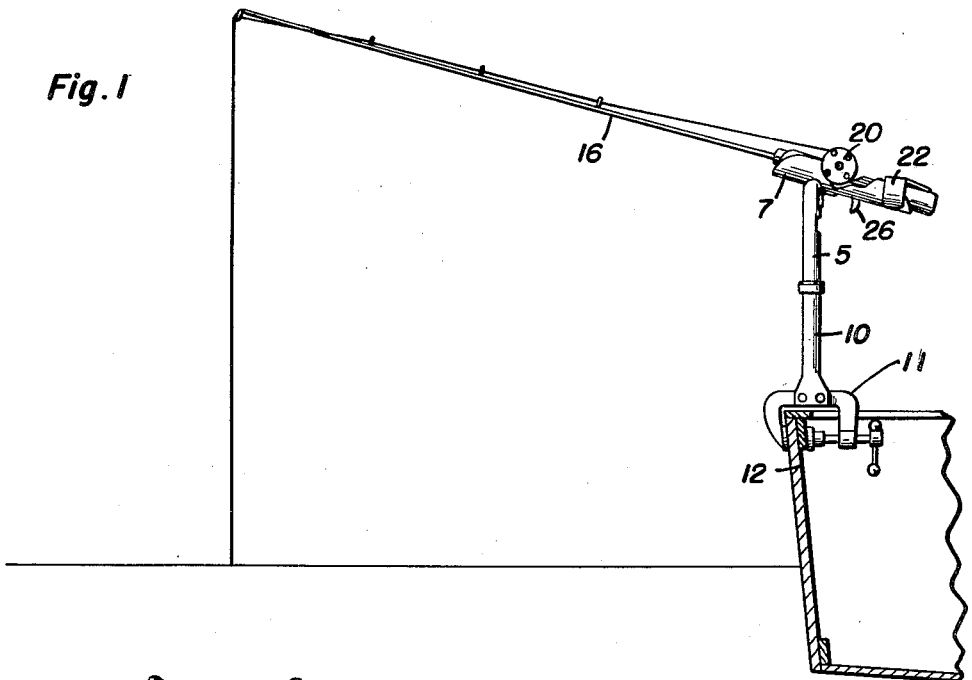
Fig. 1
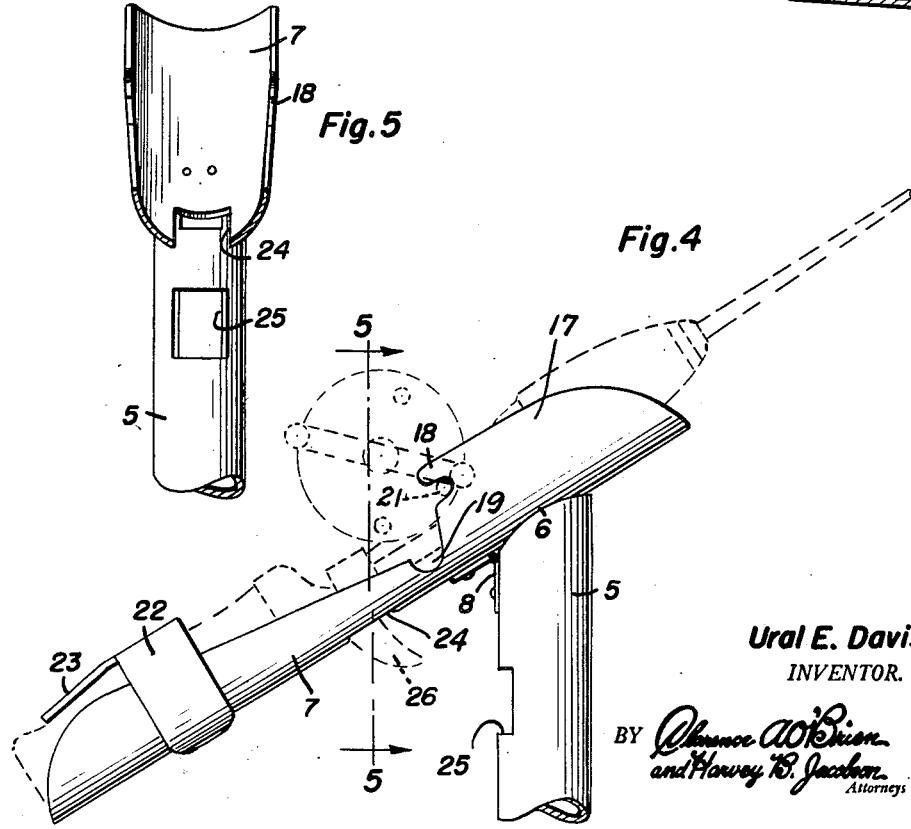
Fig. 5
Fig. 4
Ural E. Davis
INVENTOR.
BY *Clarence A. O'Brien*
*and Harvey B. Jacobson*
Attorneys March 22, 1955     U. E. DAVIS     2,704,412
FISHING ROD HOLDER
Filed Jan. 14, 1952     2 Sheets-Sheet 2
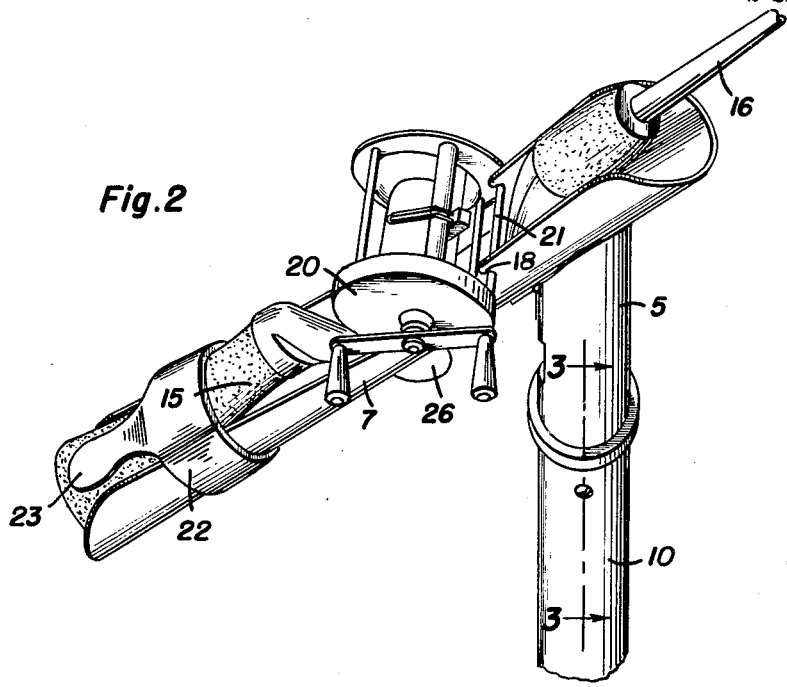
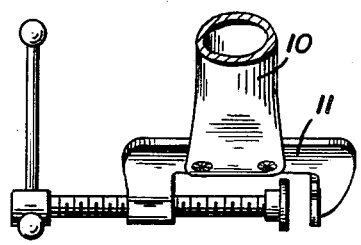
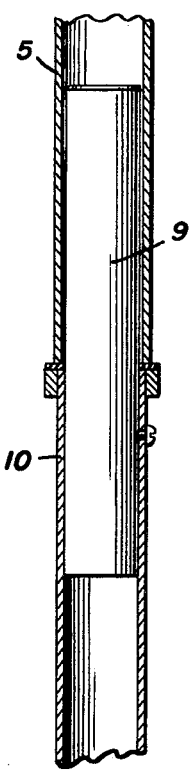
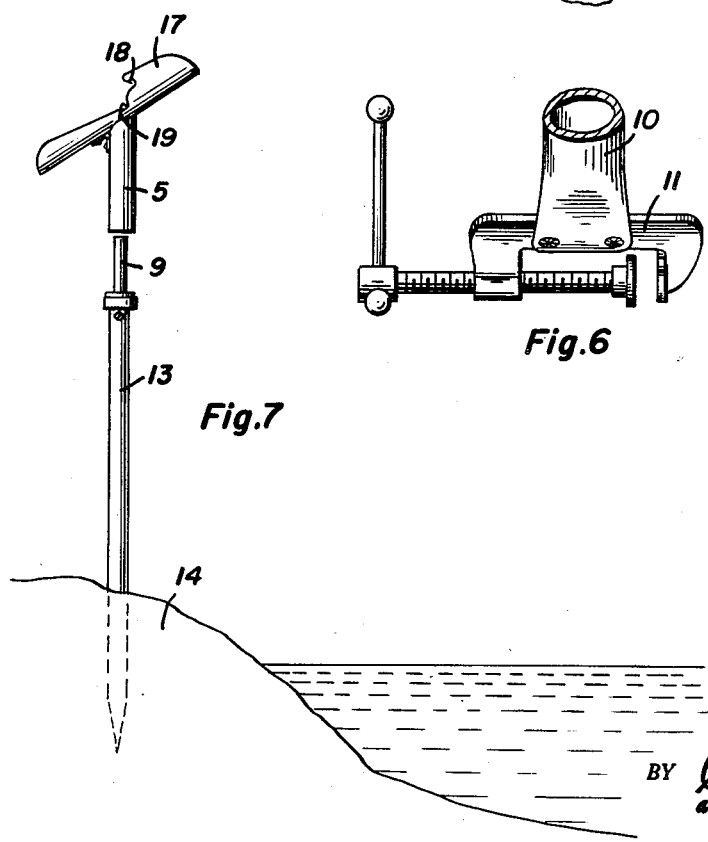
Ural E. Davis
INVENTOR.

United States Patent Office 2,704,412
Patented Mar. 22, 1955

2,704,412

FISHING ROD HOLDER

Ural E. Davis, Coral Ridge, Ky., assignor of twenty-five per cent to Isaac R. Gumer, Louisville, Ky.

Application January 14, 1952, Serial No. 266,306

1 Claim. (Cl. 43—21.2)

The present invention relates to new and useful improvements in fishing rod holders in which a fishing rod may be removably supported on a boat or on the bank of a stream.

An important object of this invention is to provide a fishing rod holder composed of a substantially semi-cylindrical cradle with means for clamping the handle of the rod therein, means for pivotally connecting the cradle to a vertical tube to provide for a vertical swinging movement of the rod and means for rotatably mounting the tube on the upper end of a standard by means of which the rod may be swung horizontally in a desired direction.

Another object of the invention is to provide a novel means for locking the handle of the fishing rod in the cradle for easily and quickly removing the fishing rod from the holder.

A still further object is to provide a device of this character of simple and practical construction, which is efficient and reliable in operation, relatively inexpensive to manufacture and otherwise well adapted to the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;
Figure 2 is a perspective view;
Figure 3 is a fragmentary vertical sectional view taken on a line 3—3 of Figure 2;
Figure 4 is a side elevational view;
Figure 5 is a vertical sectional view taken on a line 5—5 of Figure 4;
Figure 6 is a fragmentary perspective view showing the standard attached to a clamp for supporting the device on the side of a boat; and,
Figure 7 is a side elevational view showing the standard constructed in the form of a stake for supporting the holder on the bank of a stream.

Referring now to the drawing in detail wherein for the purpose of illustration I have disclosed a preferred embodiment of the invention, the numeral 5 designates a metal or other suitable tube having one end cut at an inclined angle as shown at 6 and to the inclined end of which a substantially semi-cylindrical cradle 7 is pivotally connected by means of a hinge structure 8 so that the bottom of cradle 7 may rest on the inclined end 6 of the tube, or may swing in a position parallel thereto.

The tube 5 is rotatably supported in a vertical position on the upper end of a pin 9 which is secured in the upper end of a standard 10 to provide for horizontal swinging movements of the cradle 7. The lower end of the standard 10 may be provided with a C-clamp 11 for attaching the same to the gunwale 12 of a boat, or the standard may be constructed in the form of a stake 13 for embedding in the bank 14 of a stream.

The handle 15 of a fishing rod 16 is adapted for placing in cradle 7 and the sides of the cradle, at its front end, are formed with upstanding flanges 17 having hooks 18 formed at the rear end thereof and the sides of the cradle immediately rearwardly of the flanges 17 are notched as shown at 19 to provide a seat for a reel 20 while one of the cross bars 21 forming the frame of the reel is engaged in the hook 18 to thus hold the reel from twisting or sliding forwardly in the cradle.

A substantially U-shaped resilient clip 22 is clamped on the rear end portion of the cradle 7 and overlies the handle 15 of the fishing rod to firmly hold the rod in the cradle and a finger gripping tongue 23 projects rearwardly from the clip 22 to facilitate releasing the clip from the handle and cradle.

The bottom of the cradle 7 is formed with an opening 24 therein and the rear side of tube 5 is also formed with a rear opening 25 to accommodate the finger grip 26 which projects from the underside of the rod, the finger grip 26 projecting downwardly at the underside of the cradle 7 when the rod is clamped therein and the finger grip is adapted to enter the opening 25 in tube 5 when the cradle 7 is swung downwardly into a folded position against the tube 5, or when swinging the front end of the rod 16 upwardly when reeling in the line.

In the operation of the device with the tube 5 and the cradle 7 supported in a position as shown in either Figure 1 or 7 of the drawings and with the handle 15 of a fishing rod clamped in the cradle 7 the weight of the front end of the rod will hold the front end of the cradle 7 downwardly on top of the tube 5 to thus support the fishing rod in an inclined position. The cradle 7 is then free to swing horizontally by rotating tube 5 on the pin 9 of the standard.

When it is desired to reel-in the line, the tube 5 may be lifted from pin 9, or the cradle 7 may be tilted vertically on hinge 8 to raise the front end of the rod and thereby facilitate removal of the rod from the cradle.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described my invention, what is claimed as new is:

A holder for the handle of a fishing rod of the type having a finger grip thereon, said holder comprising a tube adapted to be supported in an upright position and having an upper end, an elongated cradle for supporting the handle, a hinge connecting the bottom of the cradle to one side of the tube for swinging movement of said cradle in one direction to seat said bottom on said upper end of the tube, said cradle being swingable in the opposite direction on said hinge to position its bottom in engagement with and parallel to said side of the tube, said cradle having a bottom aperture therein for insertion of the finger grip of the handle through said bottom, said tube having an aperture in said side thereof registering with the first named aperture to accommodate said finger grip when said cradle is swung to position its bottom in engagement with said side of the tube, and a clip slidable on said cradle along the same for variable positioning along and over the handle and having a rearwardly projecting finger-grip tongue adapted to overlie said handle.

References Cited in the file of this patent

UNITED STATES PATENTS

| | | |
|---|---|---|
| 1,459,438 | Brand | June 19, 1923 |
| 2,127,790 | Smoot | Aug. 23, 1938 |
| 2,204,692 | Parisio | June 18, 1940 |
| 2,309,350 | Nanasko | Jan. 26, 1942 |
| 2,311,823 | Gaskill | Feb. 23, 1943 |
| 2,454,458 | Kaetker | Nov. 23, 1948 |
| 2,522,255 | Climo | Sept. 12, 1950 |
| 2,553,231 | Boyto | May 15, 1951 |
| 2,621,877 | Grigsby | Dec. 16, 1952 |

FOREIGN PATENTS

| | | |
|---|---|---|
| 192,787 | Great Britain | Feb. 15, 1923 |
| 774,831 | France | Dec. 14, 1934 |